Figure 2:
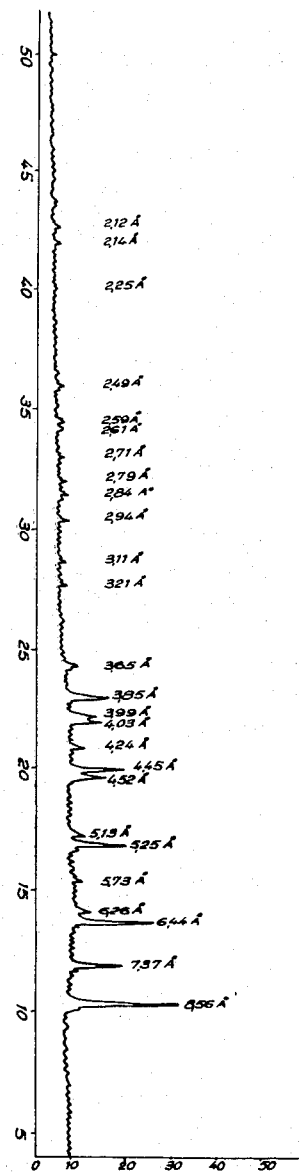

United States Patent Office 3,132,141
Patented May 5, 1964

3,132,141
ALUMINUM CONTAINING COMPLEXES OF HEXAMETHYLENE TETRAMINE
Giovanni Rebaudo, Lens, Pas-de-Calais, France, assignor to Ethylene-Plastique, Paris, France, a French society
Filed Feb. 21, 1962, Ser. No. 175,392
Claims priority, application Great Britain Feb. 21, 1961
5 Claims. (Cl. 260—242)

This invention relates to aluminum-containing complexes and to methods of preparing them.

I have found that hexamethylene tetramine forms complexes with compounds containing the

grouping, to give stable products, the properties of which, particularly as polymerization catalysts, are far superior to those of the corresponding non-complexed alkyl-aluminums.

According to the present invention, therefore, I provide a complex having the formula:

$$(CH_2)_6N_4 . aAlR_nX_{(3-n)}$$

in which:
$a$ is a number between 1 and 3,
R is an alkyl radical containing less than 7 carbon atoms,
X is a halogen atom, and
$n$ is a whole number selected from 1, 2 and 3.

Further according to the invention we provide a method of preparing these complexes which comprises reacting hexamethylene tetramine with an alkyl-aluminum or a halogenated alkyl-aluminum derivative, the alkyl group or groups of said derivative containing less than 7 carbon atoms. In this method it is preferred that the relative molar proportions of the reactants should be substantially 1 to 2. The process is advantageously carried out at or near room temperature.

Preferred methods of preparing complexes according to the invention are given below by way of example:

Example 1

$(CH_2)_6N_4 . 2AlC_2H_5Cl_2$ 6.12 g. (i.e. 43.4×10⁻³ mols) of hexamethylene tetramine, purified by crystallization from ethyl alcohol, and 40 cc. of toluene which had been dried on the absence of air were introduced into a flask provided with an agitator and filled with nitrogen. 94×10⁻³ mols of dichloromonoethyl aluminum dissolved in 30 cc. of toluene were then added, drop by drop, to the hexamethylene tetramine at atmospheric pressure and room temperature.

Initially the reaction was exothermic but for completion required heating to about 50° C. for 15 minutes. A white powder was precipitated, filtered under nitrogen, washed three times with heptane and dried at a pressure of 10⁻² mm. Hg. A yield of 13 g. of complex was obtained. 6 g. of this complex was recrystallized from toluene and, after filtration and drying, yielded 4.2 g. of a crystalline compound.

The complex thus obtained was analysed by determining the various constituents in the following manner. The aluminum was determined as $Al_2O_3$, the chlorine by the Carpentier-Volhard method, the nitrogen with a nitrometer, and the carbon and the hydrogen in a combustion furnace.

For the formula given above, the theoretical composition is:

| | Percent |
|---|---|
| Al | 13.69 |
| Cl | 35.99 |
| N | 14.22 |
| C | 30.48 |
| H | 5.63 |

In various samples, the following compositions were obtained:

| | | | | |
|---|---|---|---|---|
| Al | percent | 13.49 | 13.12 | 13.01 |
| Cl | do | 33.20 | 33.50 | 34.00 |
| N | do | 14.02 | 14.10 | 13.99 |
| C | do | 30.03 | 29.90 | 30.20 |
| H | do | 5.08 | 5.90 | 5.42 |

The complex obtained is partially soluble in toluene, more so when hot than cold, and is insoluble in aliphatic hydrocarbons. It is very stable when protected from air and humidity and it only begins to decompose, under a pressure of 10⁻² mm. Hg, at a temperature above 100° C.

Figure 1:
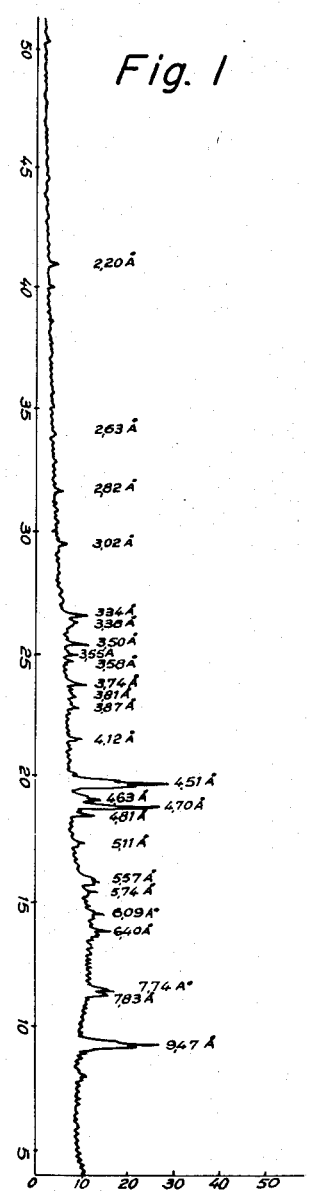

FIGURE 1 of the accompanying drawings shows the X-ray diffraction pattern of the complex thus prepared, which proves its crystallinity.

Example 2

$(CH_2)_6N_4 . 2Al(C_2H_5)_2Cl$ 15 g. (i.e. 0.12 mol) of monochlorodiethyl aluminum were reacted with 7.05 g. (i.e. 0.05 mol) of hexamethylene tetramine purified by recrystallization from ethyl alcohol, in 30 cc. of n-heptane at atmopsheric pressure and room temperature. A yield of 15.5 g. of complex was obtained, crystallized in the same manner as described in Example 1 and a similar analysis was carried out.

For the formula $(CH_2)_6N . 2Al(C_2H_5)_2Cl$ the theoretical composition is:

| | Percent |
|---|---|
| Al | 14.17 |
| Cl | 18.63 |
| C | 44.09 |
| H | 8.39 |
| N | 14.69 |

In various samples, the following compositions were obtained:

| | | | |
|---|---|---|---|
| Al | 14.03 | 13.92 | 13.94 |
| Cl | 18.20 | 18.30 | 18.10 |
| N | 14.50 | 14.42 | 14.70 |
| C | 44.11 | 44.35 | 41.90 |
| H | 8.36 | 8.41 | 8.32 |

This complex is solid at room temperature. It is stable when protected from air and humidity and only begins to decompose, at 10⁻² mm. Hg, above 100° C. It is partially soluble in toluene, more so when hot than cold, and is only slightly soluble in aliphatic hydrocarbons.

FIGURE 2 of the accompanying drawings shows the X-ray diffraction pattern of the complex thus prepared, which proves its crystallinity.

Example 3

$(CH_2)_6N_4 . 2Al(C_2H_5)_3$ 10.83 g. of hexamethylene tetramine (i.e. 0.078 mol) were reacted in the absence of a solvent with 21.5 cc. of triethyl aluminum (i.e. 0.156 mol) in a flask under an atmosphere of nitrogen. The reaction started immediately at room temperature, being exothermic, and to complete the reaction, the temperature of the reaction mixture was raised to 200° C. and the reaction mixture was refluxed at this temperature for 15 minutes.

The reaction product was then distilled in vacuo (residual pressure of 0.1 mm. Hg); the reaction product had a boiling point of 206° C.

The same complex was obtained when the process was carried out in a solvent medium and at a lower temperature, and also with different proportions of the starting materials.

Analysis of the product confirmed the formula given above. At room temperature, the product is a colorless liquid which is very viscous, soluble in organic solvents, and owing to its stability it can be distilled in vacuo without decomposition.

*Example 4*

$(CH_2)_6N_4 \cdot Al(C_4H_9)_3$ 194 cc. (i.e. 0.086 mol) of triisobutyl aluminum and 6.75 g. (i.e. 0.048 mol) of hexamethylene tetramine, purified by crystallization from ethanol, were reacted in 50 cc. of cyclohexane. The initial reaction at room temperature was exothermic, there being immediate dissolution of the hexamethylene tetramine, then on being heated to 40° C. and after 30 minutes, 7 g. of a white powder were precipitated, the analysis of which confirmed it had the composition of the formula stated above.

The same precipitate was formed when different proportions of the two starting materials were used.

The complex thus obtained is solid at room temperature; it is stable in the absence of air and humidity and is partially soluble in toluene, more so when hot than when cold, and is only slightly soluble in aliphatic hydrocarbons.

Figure 3:
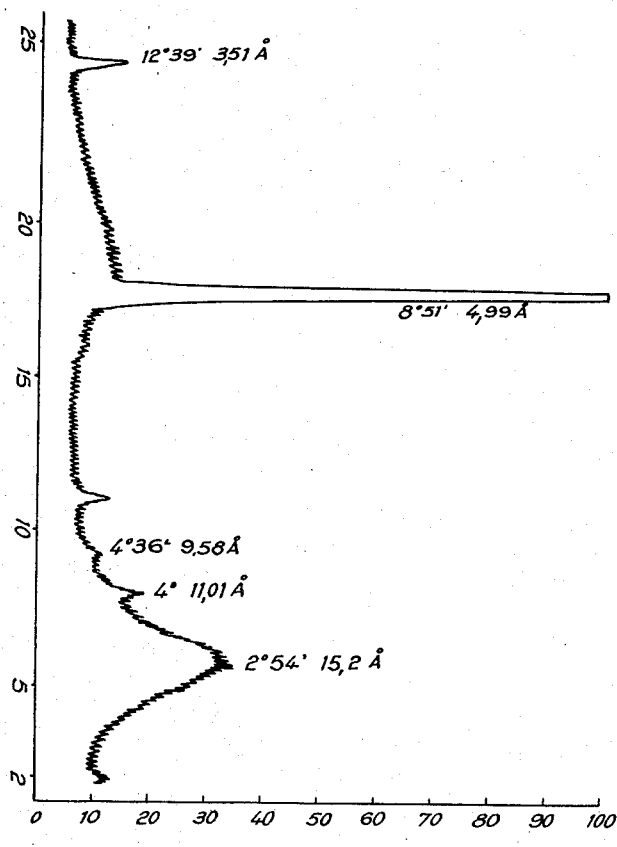

FIGURE 3 of the accompanying drawings shows the X-ray diffraction pattern of the complex thus prepared, which proves its crystallinity.

In each of these examples of preparation, an excess of one or the other of the reactants was used and it was found that the complex obtained and isolated in each case was always of the same composition. As has been seen, all the complexes are stable products which can easily be prepared and isolated. The above experiments were carried out with various solvents and the same complexes were obtained irrespective of the dilution of the reactants used.

Complexes according to the invention can also be prepared by using, instead of the alkyl-aluminum or halogenated alkyl-aluminum derivatives themselves, products which enable them to be obtained.

The complexes according to the invention are particularly useful as polymerization catalysts, either alone for polymerization and co-polymerization of aldehydes, or in combination with a co-catalyst for the polymerization and co-polymerization of alpha-olefins. In these applications they are more effective than the corresponding non-complexed alkyl-aluminum compounds, particularly when polymerization is effected at temperature below 0° C.

What is claimed is:

1. A substance of the formula $$(CH_2)_6N_4 \cdot aAlR_nX_{(3-n)}$$

in which $a$ is a number between 1 and 3,
R is an alkyl of 1–6 carbon atoms,
X is a halogen atom, and
$n$ is a whole number selected from 1, 2 and 3.

2. The substance of the formula $(CH_2)_6N_4 \cdot 2AlC_2H_5Cl_2$.
3. The substance of the formula $$(CH_2)_6N_4 \cdot 2Al(C_2H_5)_2Cl$$

4. The substance of the formula $$(CH_2)_6N_4 \cdot 2Al(C_2H_5)_3$$

5. The substance of the formula $$(CH_2)_6N_4 \cdot Al(C_4H_9)_3$$

References Cited in the file of this patent

UNITED STATES PATENTS 3,066,139    Zhivadinovich et al. _____ Nov. 27, 1962

FOREIGN PATENTS 15,020    Great Britain _____ May 28, 1914
(1913 Series)

OTHER REFERENCES

Smolin et al.: S-Triazine and Derivatives, Interscience Pub. Inc., New York, 1959, p. 555.
Bonitz: Chemische Berichte, vol. 88, pp. 742–751, 1955.